(12) United States Patent
Boye

(10) Patent No.: US 6,940,606 B2
(45) Date of Patent: Sep. 6, 2005

(54) NON-ETALON REFLECTIVE WAVELENGTH LOCKING OPTICAL SUB-ASSEMBLY AND ASSOCIATED METHODS

(75) Inventor: Robert Russell Boye, Charlotte, NC (US)

(73) Assignee: Digital Optics Corp., Charlotte, NC (US)

( * ) Notice: Subject to any disclaimer, the term of this patent is extended or adjusted under 35 U.S.C. 154(b) by 227 days.

(21) Appl. No.: 10/238,980

(22) Filed: Sep. 11, 2002

(65) Prior Publication Data

US 2003/0072010 A1 Apr. 17, 2003

Related U.S. Application Data

(60) Provisional application No. 60/325,540, filed on Oct. 1, 2001.

(51) Int. Cl.$^7$ ................................................. G01B 9/02
(52) U.S. Cl. ..................................................... 356/520
(58) Field of Search ............................... 356/454, 519, 356/520; 372/32

(56) References Cited

U.S. PATENT DOCUMENTS

| | | | | |
|---|---|---|---|---|
| 5,289,314 A | * | 2/1994 | Siebert ........................ | 359/586 |
| 5,341,204 A | * | 8/1994 | Grant et al. ................ | 359/35.5 |
| 5,355,218 A | * | 10/1994 | Matsuda et al. ............ | 356/520 |
| 5,535,003 A | | 7/1996 | Kawashima | |
| 5,680,210 A | * | 10/1997 | Swanson ..................... | 356/450 |
| 5,956,356 A | | 9/1999 | Bergmann et al. | |
| 6,178,002 B1 | | 1/2001 | Mueller-Wirts | |
| 6,339,603 B1 | | 1/2002 | Flanders et al. | |

FOREIGN PATENT DOCUMENTS

| | | |
|---|---|---|
| EP | 0 911 621 A2 | 4/1999 |
| EP | 1 052 526 A2 | 11/2000 |
| WO | WO 97/05679 | 2/1997 |

* cited by examiner

*Primary Examiner*—Gregory J. Toatley, Jr.
*Assistant Examiner*—Michael A. Lyons
(74) *Attorney, Agent, or Firm*—Susan S. Morse

(57) ABSTRACT

A wavelength detector includes an optical structure receiving an input beam, the optical structure outputting at least two wavelength dependent two-beam interference signals. Each wavelength dependent two-beam interference signal has a different phase offset. A detector receives the at least two wavelength dependent two-beam interference signals and outputs an electrical signal representative of each wavelength dependent two-beam interference. A processor receives the at least two electrical signals from the detector and generates a composite control signal. The two-beam interference signals may be created by reflecting light off the two surfaces of the optical structure. The different phase offsets may be created by providing a stepped pattern on one of the surfaces of the optical structure. Phase shifting interferometry techniques may be used to determine the wavelength from the periodic signals.

10 Claims, 1 Drawing Sheet

NON-ETALON REFLECTIVE WAVELENGTH LOCKING OPTICAL SUB-ASSEMBLY AND ASSOCIATED METHODS

CROSS-REFERENCE TO RELATED APPLICATIONS

The present application claims priority under 35 U.S.C. §119(e) to U.S. Provisional Application Ser. No. 60/325,540 entitled "Non-etalon combined splitter wavelength locking optical sub-assembly and associated methods" filed Oct. 1, 2001, the entire contents of which are hereby incorporated by reference for all purposes. The present application is also related to commonly assigned, co-pending U.S. patent application Ser. No. 10/033,171 entitled "Non-etalon wavelength locking sub-assembly and associated methods" filed Dec. 28, 2001, and to commonly assigned, co-pending PCT Application Ser. No. PCT/US01/21272 entitled "Integrated wavelength locker for use with more than one wavelength and associated methods" filed Jul. 6, 2001, the entire contents of both of which are hereby incorporated by reference for all purposes.

FIELD OF THE INVENTION

The present invention is directed to a tunable wavelength monitor/locker using interfering signals for use with more than one wavelength, more particularly to an integrated wavelength locker which can be placed in an optical path of an application beam or in an optical path of a monitor beam. More particularly, the wavelength locker of the present invention uses two-beam interference signals to realize continuous operation.

BACKGROUND OF THE INVENTION

Some radiation sources exhibit wavelength drift over time in excess of that tolerable for many applications. This drift becomes increasingly important as the lifetimes over which these radiation sources are to be deployed increases. Factors such as temperature, age, operating power level, etc., all affect the output wavelength. Parameters such as the direction of the wavelength change, the degree of the change, and the percentage of the light being radiated at the different wavelengths may be monitored. By monitoring any or all these parameters, the radiation source may be controlled in accordance with known techniques to stabilize the output of the radiation source.

Such monitoring and stabilizing systems typically involve using a unit which is external to the radiation source itself. Such external units include crystal gratings, fiber gratings, spectrometers, and Fabry-Perot etalons, both straight and inclined. The grating systems include relatively large control units external to the radiation source. While etalon-based systems offer a more compact solution, so far these etalons are still separate units which may become improperly aligned, either with photodetectors or with optical elements required to direct and control the light onto the photodetectors. Further, etalons are very sensitive to angular alignment.

Etalons are very expensive, due to the tight requirements thereon to insure proper performance thereof. This expense is even further increased when the etalon is to be miniaturized. Thus, it would be advantageous to create a wavelength locker which did not rely on an etalon and which can provide continuous monitoring over an operational range.

SUMMARY OF THE INVENTION

The present invention is therefore directed to a wavelength monitor/locker which substantially overcomes one or more of the problems due to the limitations and disadvantages of the related art.

It is an object of the present invention to provide a more compact wavelength monitor. It is a further object of the present invention to provide a cheaper wavelength monitor. It is still another object of the present invention to provide a wavelength monitor that is more robust.

At least one of these and other objects may be realized by providing a wavelength detector including an optical structure receiving an input beam, the optical structure outputting at least two wavelength dependent two-beam interference signals, each wavelength dependent two-beam interference signal having a different phase offset. The optical structure has a first and second surface. A first beam is reflected off the first surface and a second beam being reflected off the second surface. A remainder of the input beam passes through the optical structure. The first and second beams overlap to form the at least two wavelength dependent two-beam interference signals. A detector receives the at least two wavelength dependent two-beam interference signals and outputs an electrical signal representative of each wavelength dependent two-beam interference. A processor receives the at least two electrical signals from the detector and generates a composite control signal.

The processor may use phase shifting interferometric techniques to generate the composite control signal. The optical structure may include a stepped pattern on one of the first and second surfaces providing different phase offsets to the at least two wavelength dependent two-beam interference signals. The stepped pattern may include three discrete steps and three wavelength dependent two-beam interference signals are formed. The stepped pattern may be linear. The input beam is incident on the optical structure at an angle and may maximize an overlap between the first and second beams at the detector. The detector may include a corresponding number of separate detectors for each wavelength dependent two-beam interference signal or may be an integral detector receiving the wavelength dependent two-beam interference signals.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

The non-etalon wavelength locker design of the present invention generates one or more sinusoidal signals and analyzes these sinusoidal signals using phase shifting interferometry techniques to determine the wavelength of an input beam. Such sinusoidal signals may be created using two-beam interference, as opposed to the multiple beam interference created from an etalon. The two-beam interference patterns are more sinusoidal than the signals output from a conventional etalon.

Figure 1:
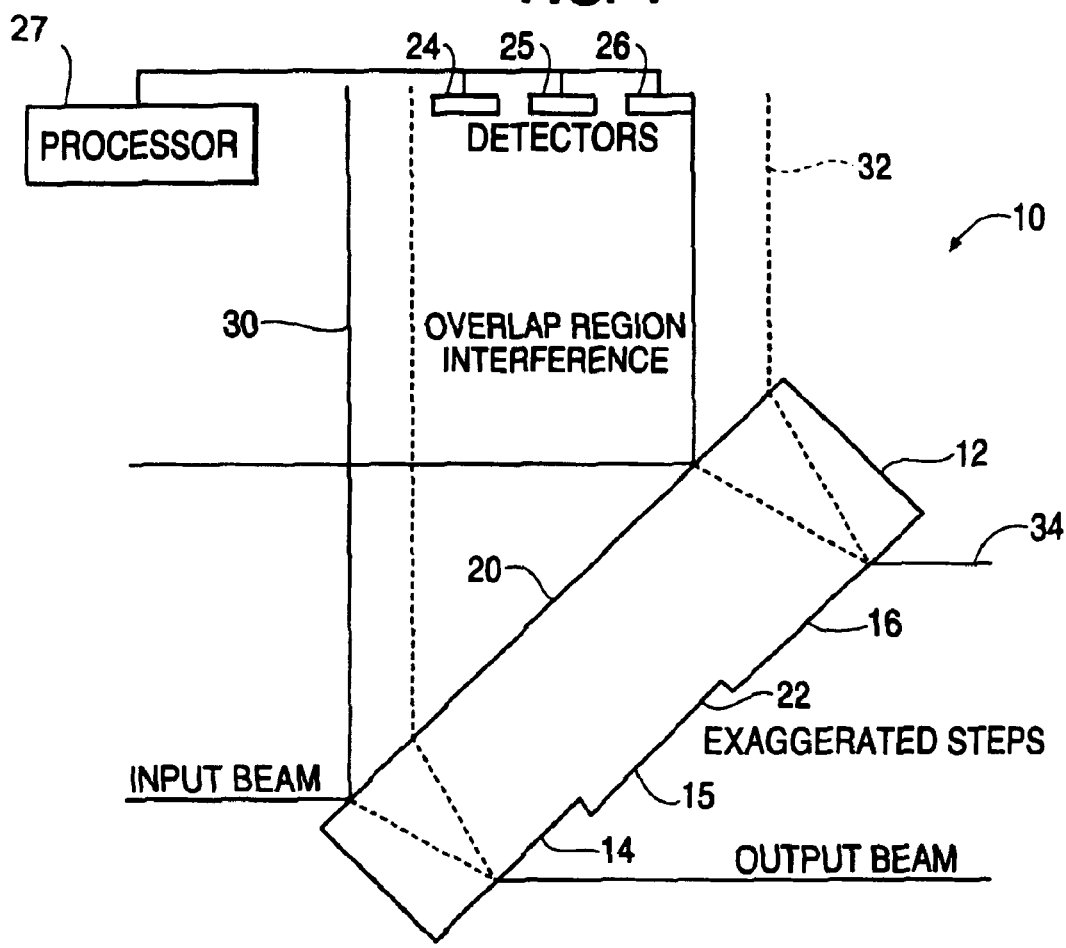
FIG. 1 is a schematic view of a wavelength locker system of the present invention.

FIG. 1 illustrates a schematic cross-sectional view of a wavelength locker 10 of the present invention. The wavelength locker 10 includes a transparent substrate 12, having steps 14–16 therein, and corresponding detectors 24–26. The steps 14–16 are not to scale and have been exaggerated for ease of explanation. The transparent substrate 12 is provided at an angle to an input beam. When the input beam hits a first surface 20 of the transparent substrate, a portion 30 of the input beam is reflected to the detectors 24–26. When the beam traverses the transparent substrate 12 and hits a second surface 22 of the transparent substrate, a portion 32 of the beam is again reflected to the detectors 24–26. The remainder of the beam 34 may be output for further use.

It is noted that in this configuration, by positioning the substrate 12 and the input beam at an angle relative to one another, the substrate 12 provides the splitting of the beam, the reflecting of the beams to the detectors, and the shifting of the reflected beams relative to one another. The surfaces 20, 22 of the substrate 12 may be coated, e.g., with anti-reflection coatings or other thin film coatings, to control the amount of light reflected therefrom. Further, the substrate 12 does not need to be mounted at 45 degrees as shown in FIG. 1, but can be positioned to maximize the overlap region, i.e., the offset between the reflections from the first surface 20 and the second surface 22 is minimized. The second surface 22 may also be over coated to reduce the phase aberration on the transmitted beam 34.

The beam 30 from the first surface and the beam 32 from the second surface overlap and will interfere at the detectors 24–26. The periodic sinusoidal signals generated at the detectors will be offset due to the steps 14–16 in the second surface 22 of the transparent substrate 12. These offset periodic outputs are supplied to a processor 27 for monitor and/or control of the wavelength of a light source, as discussed below.

Figure 2:
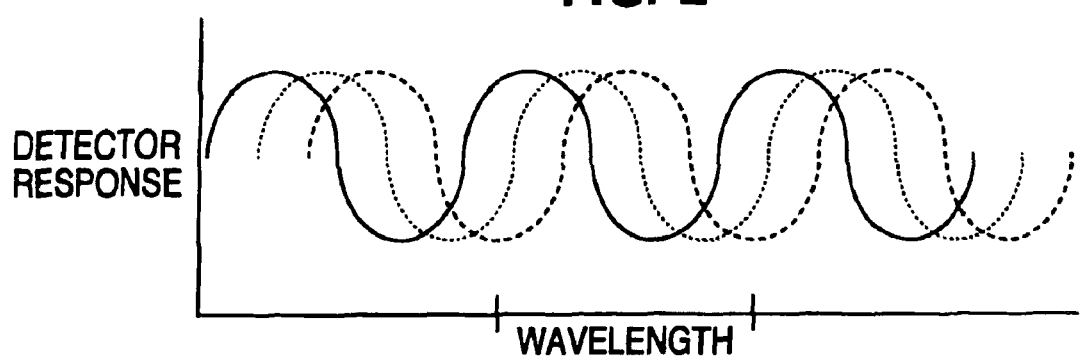
FIG. 2 is a representational output of the different detectors of FIG. 1.

These shifted signals output from the detectors 24–26 are shown in FIG. 2. As is apparent from FIG. 2, throughout much of the response, both the function and its first derivative are smooth and continuously varying, i.e., a small shift in wavelength will produce a change in intensity for most wavelength values. However, where the slope of the curve approaches zero, this no longer holds true. This can be rectified by introducing either a linear reference signal or two other patterns which are shifted relative to one another so that at least one curve will have a sufficiently steep slope when slopes of other curves approaches zero. By using a reference signal, use of at least two offset steps will allow continuous operation.

When using three periodic signals only, these signals just need to be spaced such that the slope for at least one of the signals is non-zero for every wavelength in the operational range. The system can be expanded to more than three step-detector pairs to reduce sensitivity to errors in the steps and system noise. Further, since the relative shift is used to determine the wavelengths, which are characterized a priori, the requirements on the accuracy of the steps is reduced, allowing the steps to be manufactured cheaply.

When provided with three periodic signals, by using a phase shift in the reference leg, from interferometry techniques, a system of three equations and three unknowns can be generated. The reference beam intensity can then be solved for, rather than monitored independently. The relevant equations for phase shifting interferometry are:

$$I_i(x,y)=I_R(x,y)+I'(x,y)cos(\phi(x,y)+\beta_i) \qquad (1)$$

where $I_i$ is the intensity for each beam, $I_R$ is the reference intensity, I' is the intensity of the input beam, ø is the phase of the input beam, and $\beta_i$ is the reference beam phase for each patterned region, where $\beta_0=0$, $\beta_1=\pi/2$ and $\beta_2=\pi$. The wavelength is a function of ø.

Dropping the (x,y) position dependency for simplicity, the solutions for the three unknowns are:

$$I_R = \frac{I_0 + I_2}{2} \qquad (2)$$

$$I'=2\sqrt{(I_0-I_2)^2+(2I_1-I_0-I_2)^2} \qquad (3)$$

$$\phi = \arctan\left(\frac{I_2 - I_1}{I_0 - I_1}\right) \qquad (4)$$

The above interferometric approach may be used whenever there are at least three signals having a periodic nature with respect to wavelength. As used herein, "periodic" does not mean strict repeatability, only that the signal is sufficiently repeatable to allow interferometric equations to be used. In order to insure accurate identification of the wavelength, the periodic signals should be spaced relative to one another such that their flatter portions do not all overlap, i.e., a set consisting of a value for each of the detectors will uniquely identify the wavelength in a given range. In other words, at any coordinate, at least one signal has a steep enough slope to allow a change in wavelength to be detected. The properties of the diffractive elements and the transmittance properties of materials used in the system will determine the operational wavelength range.

The continuous nature of the wavelength determination results in a configuration for which the elements do not have to be altered if there is a change in spacing between the wavelengths being used. Further, the above configuration does not rely on a reference beam to accurately determine the wavelength, also rendering the configuration easily adaptable to changing requirements. However, the longer the period, the worse the accuracy, since the more likely two signals are to be substantially flat over the same wavelength region. This may be compensated for by including more steps and corresponding detectors. This configuration is also less sensitive to thermal shifts than a configuration using an etalon.

Thus, the present invention uses an optical structure to create two overlapping beams at an output plane. The overlapping beams create wavelength dependent two-beam interference at the output plane. This wavelength dependent two-beam interference creates a periodic signal that is more nearly sinusoidal with respect to wavelength than the typical etalon output. The important feature is not that the wavelength dependent signal is necessarily sinusoidal, but that a region over which a signal value does not represent a unique wavelength is reduced, i.e., regions where the slope of the signal with respect to wavelength is substantially zero, are reduced. This results in fewer unresolvable regions for each wavelength dependent two-beam interference as compared with the use of a costly etalon.

The present invention also uses the optical structure to create more than one wavelength dependent two-beam interference signal. By creating two or more such interference patterns with a phase difference between them, the unresolvable regions can be further reduced. These signals are detected and processed, e.g., using phase-shifting interferometry techniques, to determine the wavelength. In contrast to previous techniques, error signals for each output are not used to control the laser, but a single value representing a composite picture of the system from the wavelength dependent periodic signals is output, making the system of the present invention more robust than such previous solutions.

In the particular embodiments shown, the phase difference is introduced by providing steps of different thicknesses in the path of the beam and appropriately placed corresponding detectors. It is noted that the steps shown in FIG. 1 are not necessarily to scale. Further, the present invention is not limited to the linear embodiment shown in FIG. 1, but the phase differences may be introduced anywhere on the back surface of the splitter with corresponding detectors located at an appropriate spatial arrangement. For example, the back surface of the splitter could be divided into quadrants providing different optical path lengths to the input beam, with the detectors arranged in a corresponding quadrature configuration.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. A wavelength detector comprising:

an optical structure receiving an input beam, the optical structure outputting at least two wavelength dependent two-beam interference signals, each wavelength dependent two-beam interference signal having a different phase offset, the optical structure having a first and second surface, a first beam being reflected off the first surface and a second beam being reflected off the second surface, a majority of the input beam passing directly through the optical structure, the first and second beams overlapping to form the at least two wavelength dependent two-beam interference signals;

a detector receiving the at least two wavelength dependent two-beam interference signals and outputting an electrical signal representative of each wavelength dependent two-beam interference; and a processor receiving the at least two electrical signals from the detector and generating a composite signal.

2. The wavelength detector of claim 1, wherein the processor uses phase shifting interferometric techniques to generate the composite signal.

3. The wavelength detector of claim 1, wherein the optical structure comprises a stepped pattern on one of the first and second surfaces providing different phase offsets to the at least two wavelength dependent two-beam interference signals.

4. The wavelength detector of claim 3, wherein the stepped pattern includes three discrete steps and three wavelength dependent two-beam interference signals are formed.

5. The wavelength detector of claim 3, wherein the stepped pattern is linear.

6. The wavelength detector of claim 1, wherein the input beam is incident on the optical structure at an angle.

7. The wavelength detector of claim 6, wherein the angle between the input beam and the optical structure maximizes an overlap between the first and second beams at the detector.

8. The wavelength detector of claim 1, wherein the detector includes a corresponding number of separate detectors for each wavelength dependent two-beam interference signal.

9. The wavelength detector of claim 1, wherein the detector is an integral detector receiving the wavelength dependent two-beam interference signals.

10. The wavelength detector of claim 1, wherein the input beam is from a light source and the composite signal from the processor is used to control a wavelength of the light source.

* * * * *